Dec. 14, 1954  J. J. MADDEN  2,696,656
TOOL FOR MAKING ELECTRICAL CONNECTIONS
Filed July 24, 1953  9 Sheets-Sheet 1
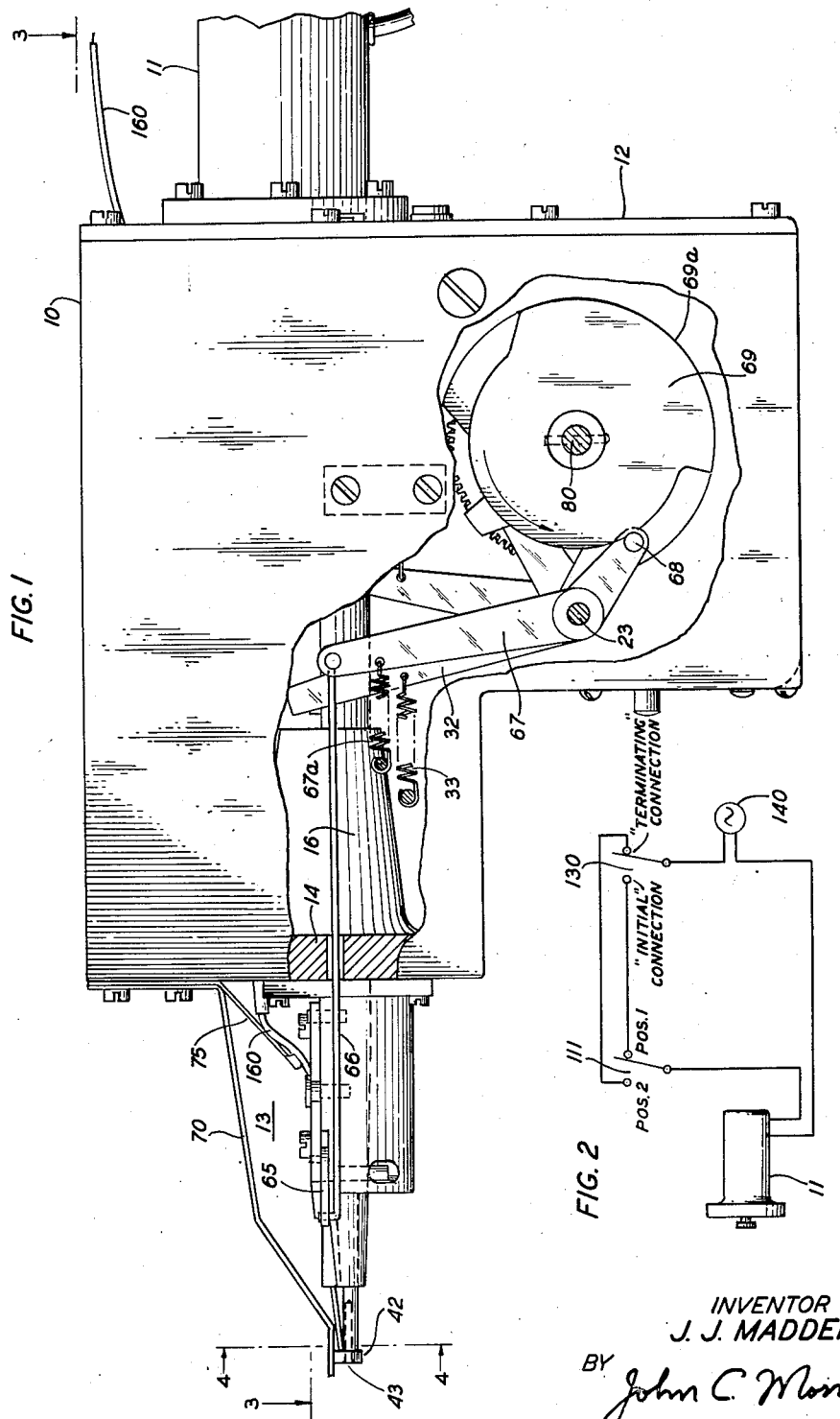
INVENTOR
J. J. MADDEN
BY John C. Morris
ATTORNEY Dec. 14, 1954 J. J. MADDEN 2,696,656
TOOL FOR MAKING ELECTRICAL CONNECTIONS
Filed July 24, 1953 9 Sheets-Sheet 2
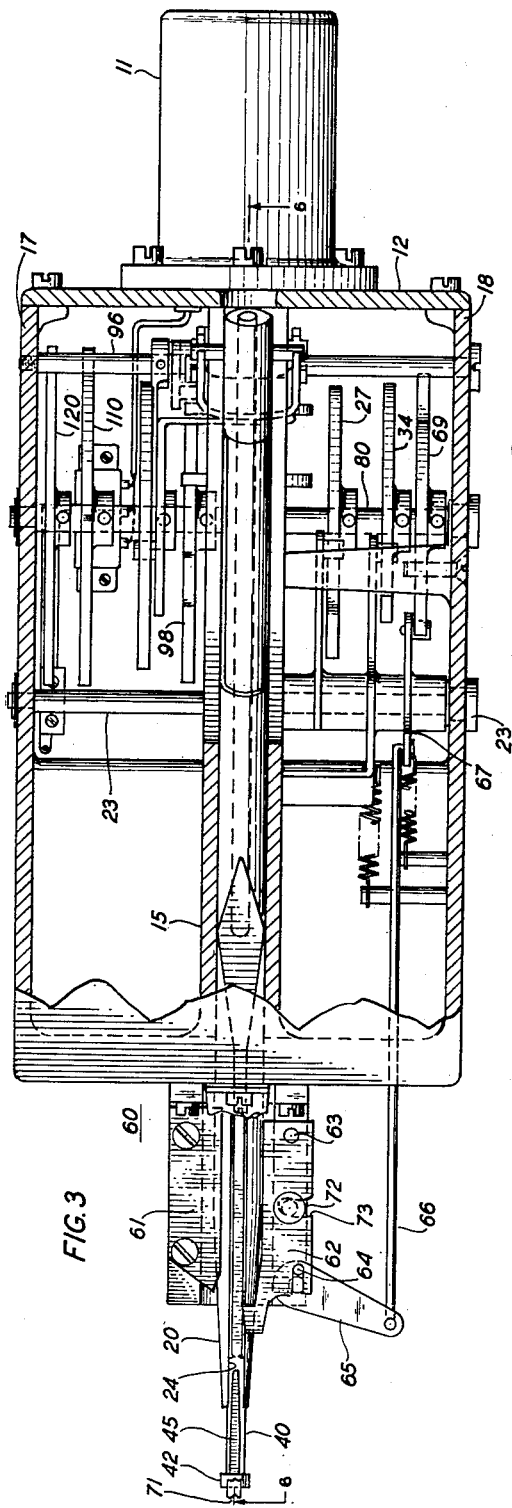
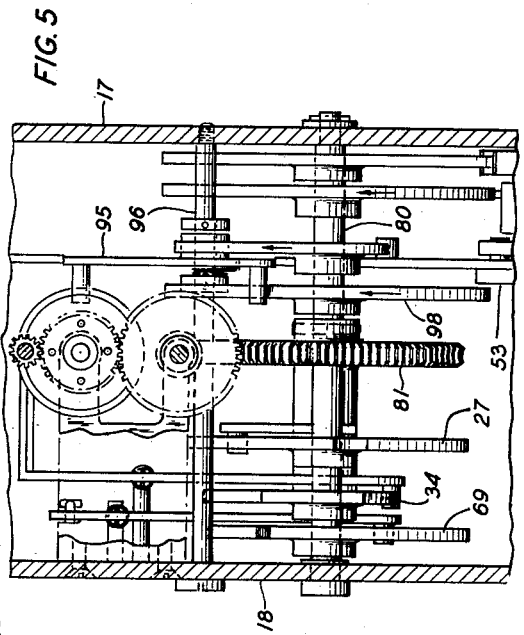
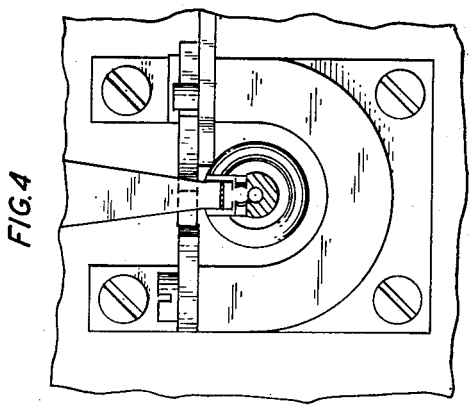
INVENTOR
J. J. MADDEN
BY John C. Monis
ATTORNEY Dec. 14, 1954    J. J. MADDEN    2,696,656
TOOL FOR MAKING ELECTRICAL CONNECTIONS
Filed July 24, 1953    9 Sheets-Sheet 3
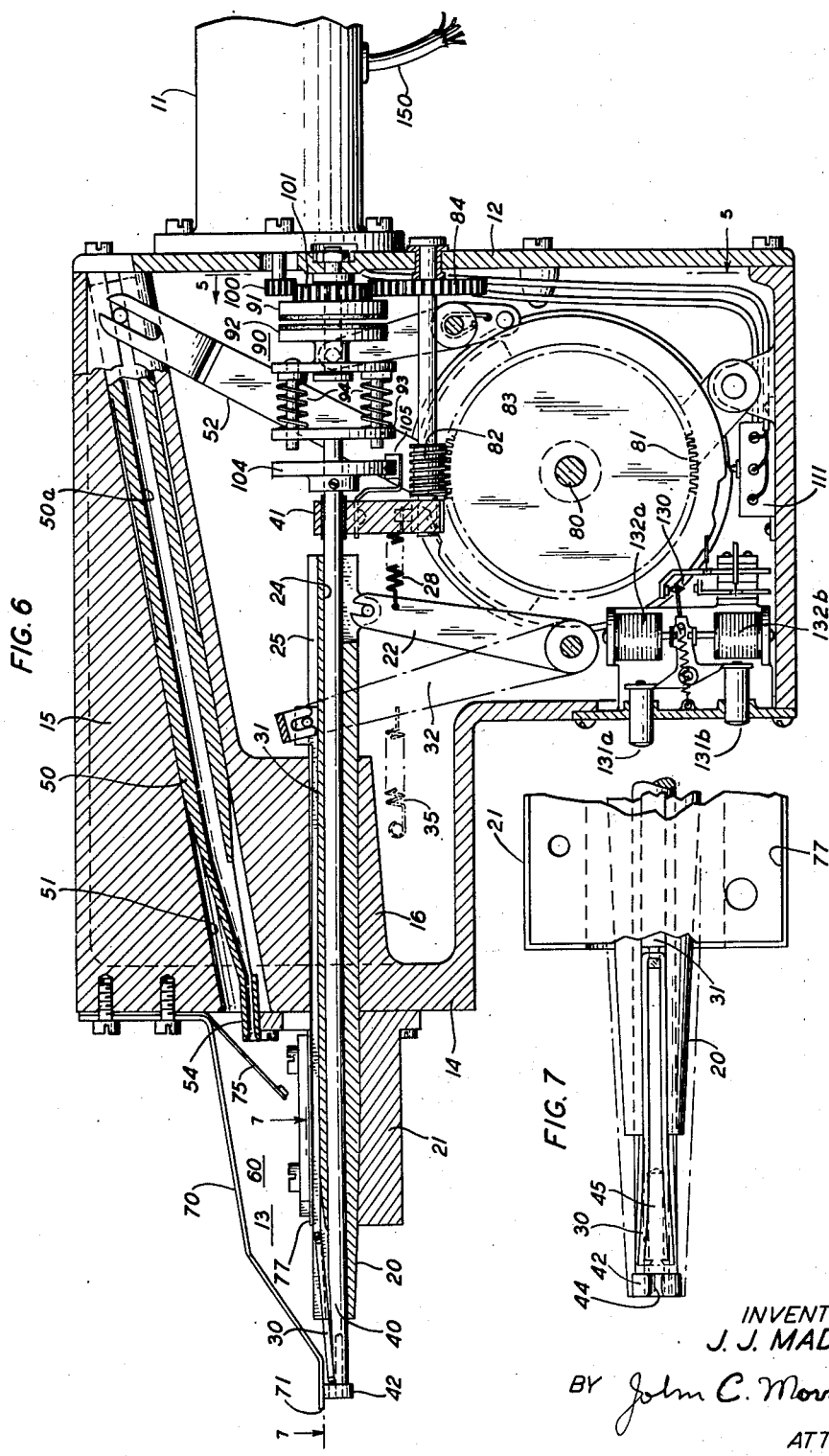
INVENTOR
J. J. MADDEN
BY John C. Morris
ATTORNEY Dec. 14, 1954  J. J. MADDEN  2,696,656
TOOL FOR MAKING ELECTRICAL CONNECTIONS
Filed July 24, 1953  9 Sheets-Sheet 4
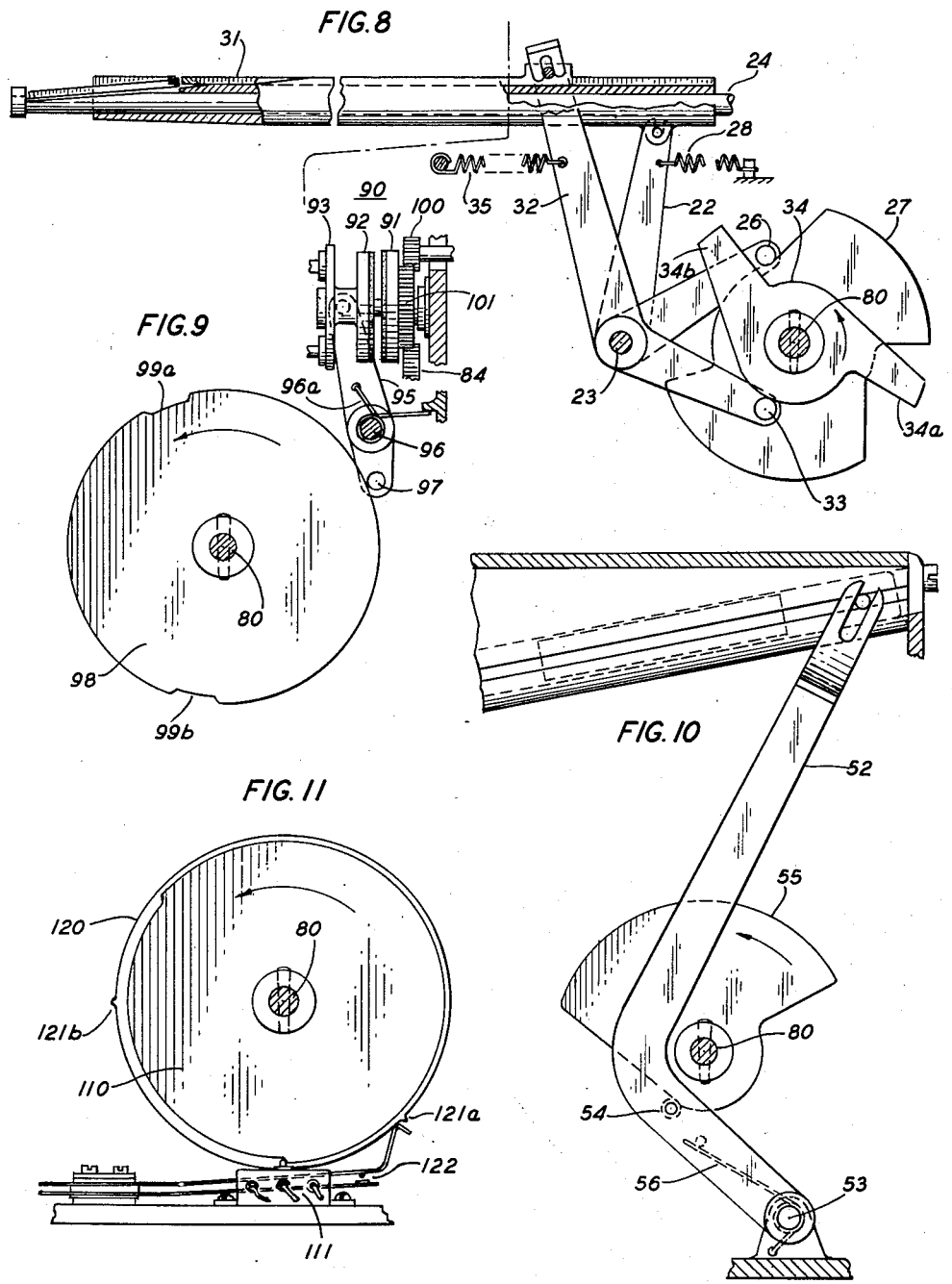
INVENTOR
J. J. MADDEN
BY John C. Morris
ATTORNEY

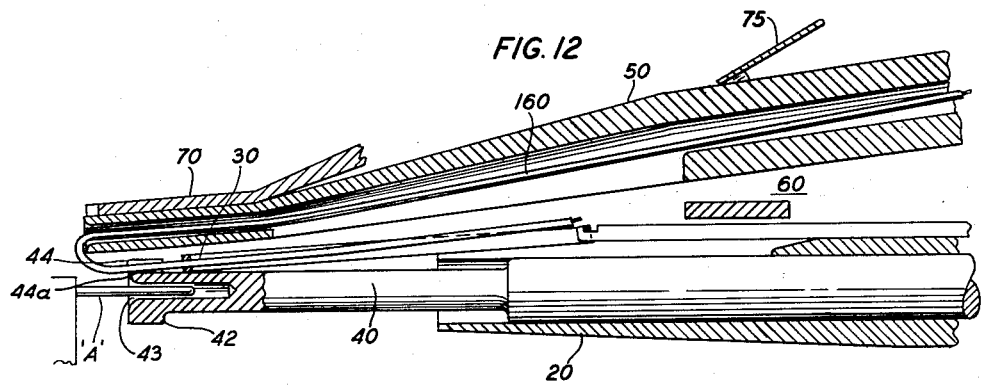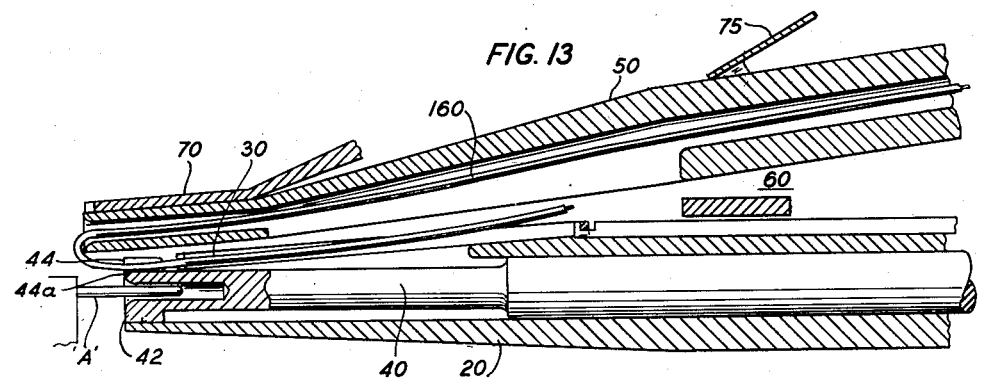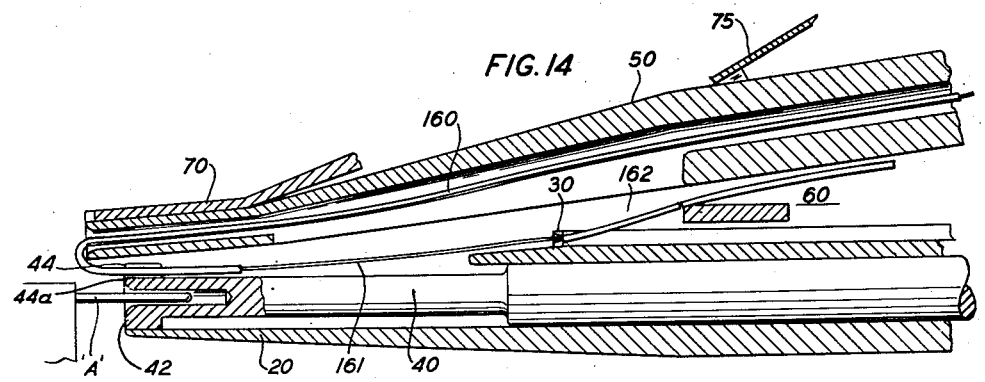

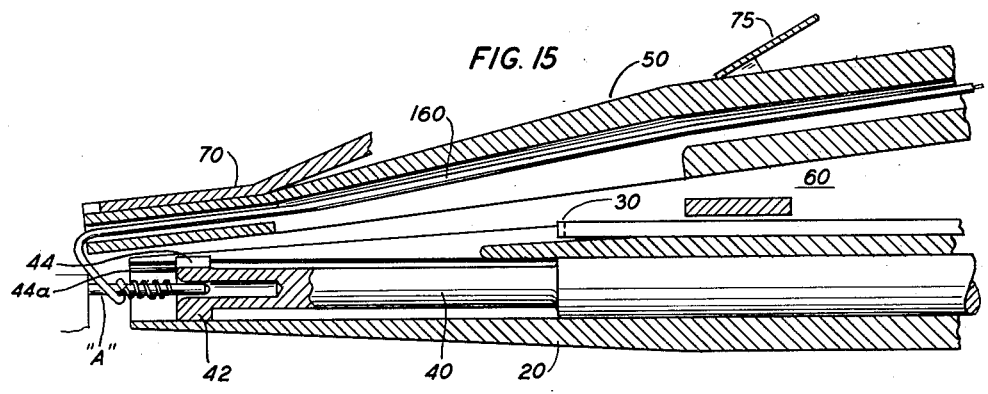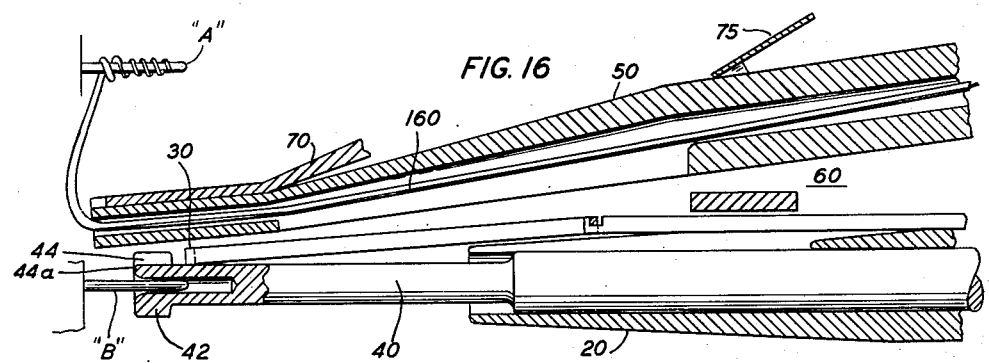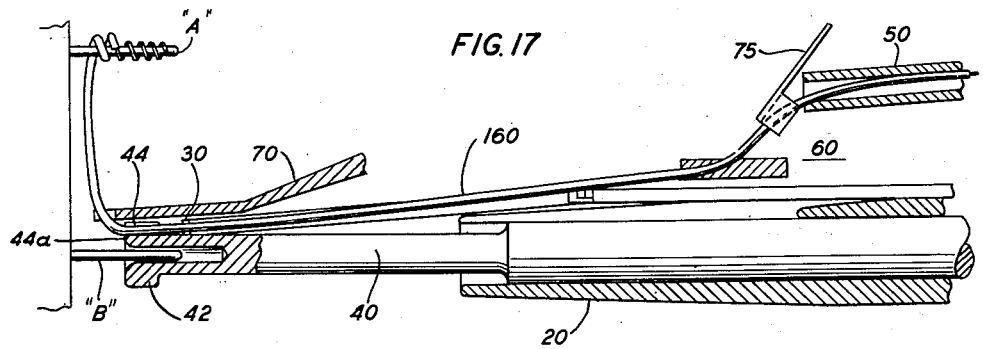

Dec. 14, 1954        J. J. MADDEN        2,696,656
TOOL FOR MAKING ELECTRICAL CONNECTIONS
Filed July 24, 1953                    9 Sheets-Sheet 7
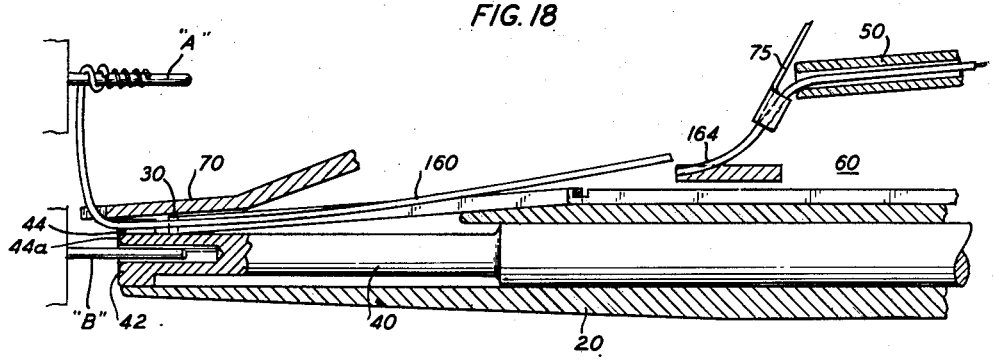
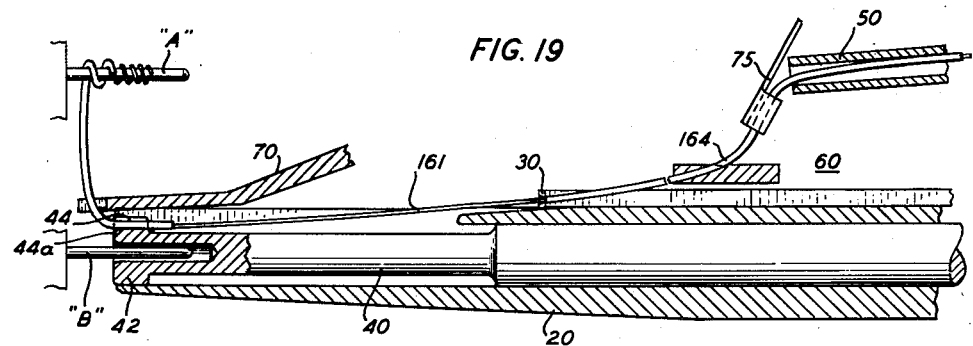
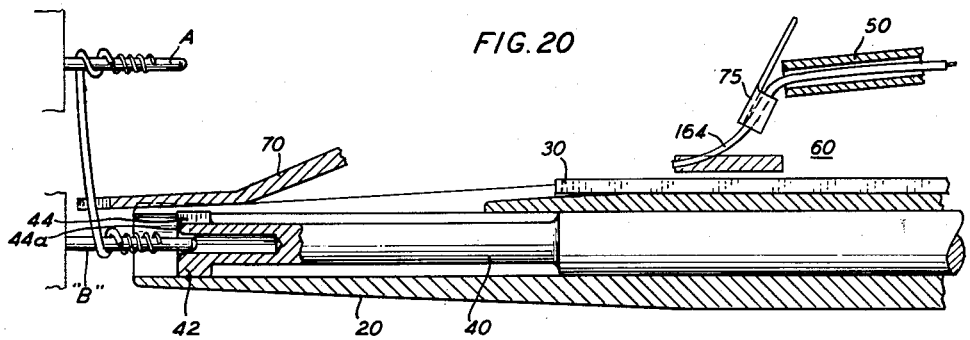
INVENTOR
J. J. MADDEN
BY John C. Morris
ATTORNEY Dec. 14, 1954            J. J. MADDEN            2,696,656
TOOL FOR MAKING ELECTRICAL CONNECTIONS
Filed July 24, 1953            9 Sheets-Sheet 8
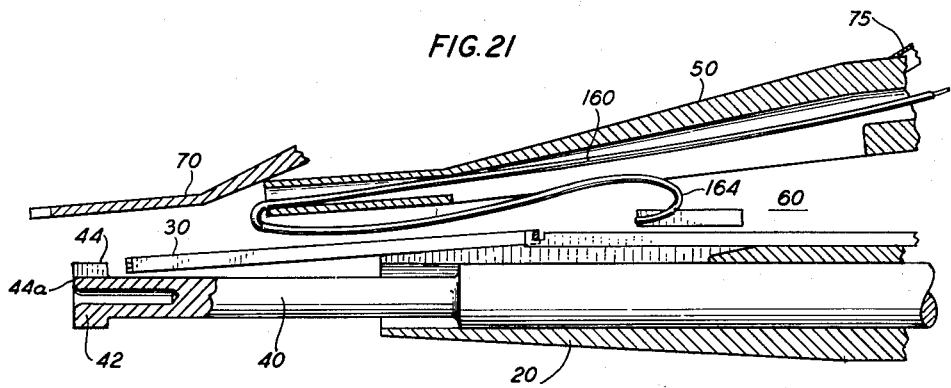
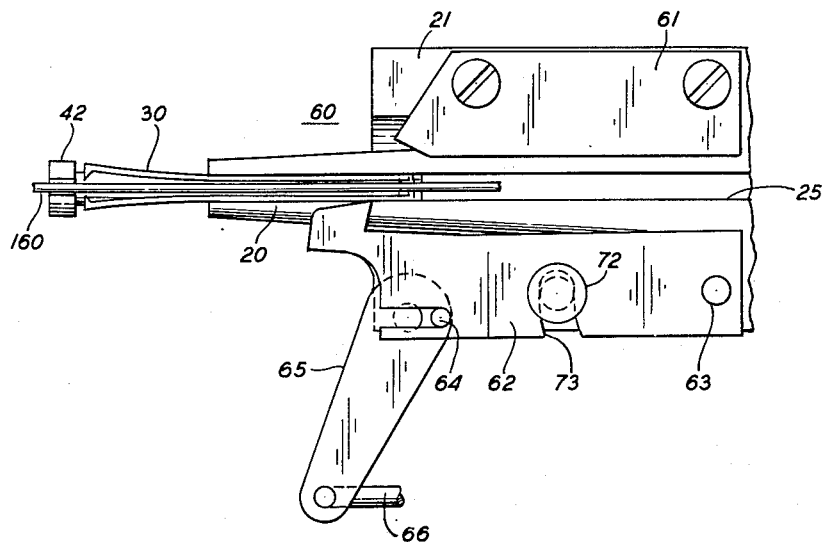
INVENTOR
J. J. MADDEN
BY John C. Morris
ATTORNEY Dec. 14, 1954  J. J. MADDEN  2,696,656
TOOL FOR MAKING ELECTRICAL CONNECTIONS
Filed July 24, 1953  9 Sheets-Sheet 9
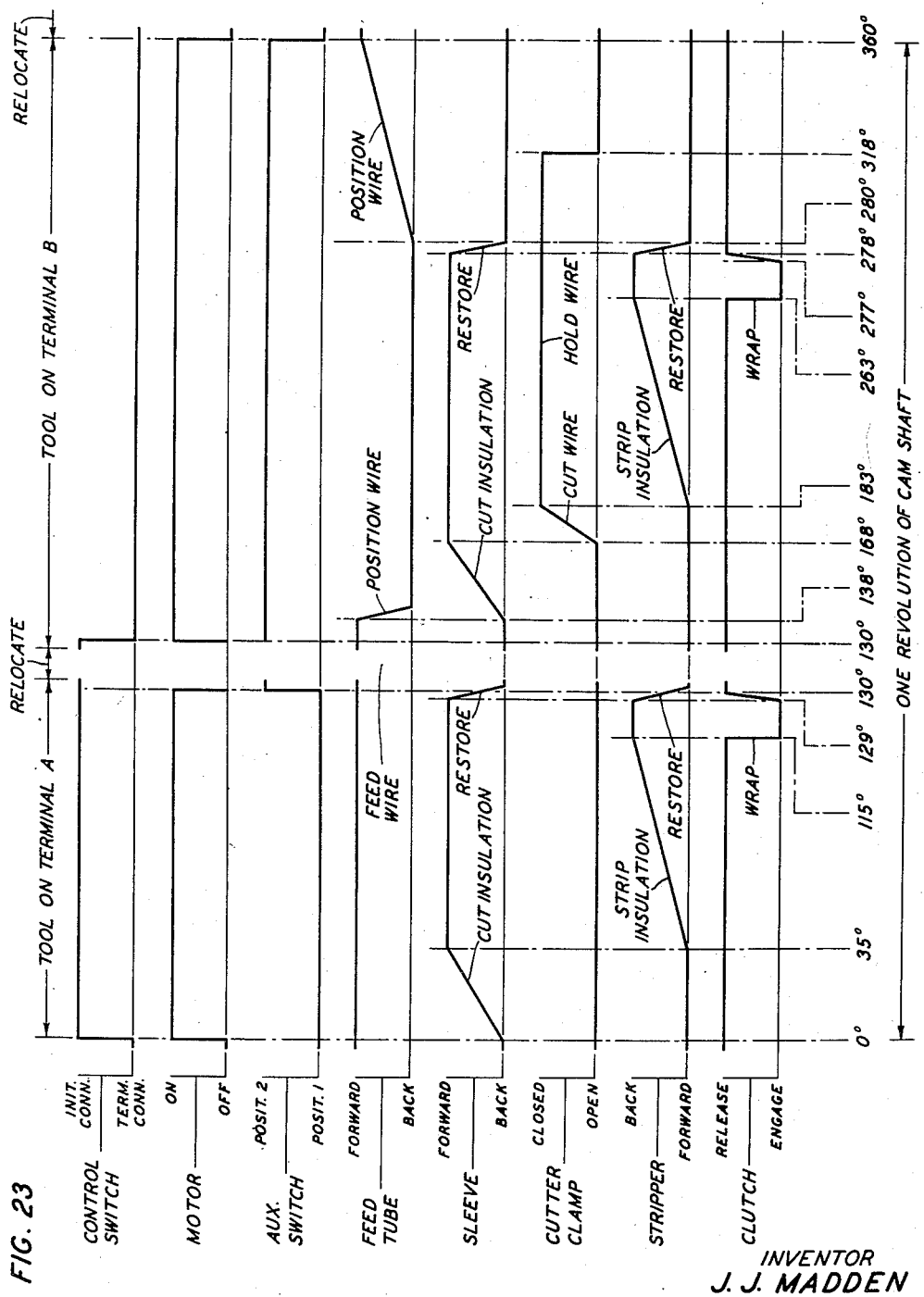
INVENTOR
J. J. MADDEN
BY
John C. Morris
ATTORNEY

United States Patent Office 2,696,656
Patented Dec. 14, 1954

2,696,656
TOOL FOR MAKING ELECTRICAL CONNECTIONS

James J. Madden, Woodhaven, N. Y., assignor to Bell Telephone Laboratories, Incorporated, New York, N. Y., a corporation of New York Application July 24, 1953, Serial No. 370,057

20 Claims. (Cl. 29—33)

This invention relates to tools for making electrical connections and more particularly to automatic or semiautomatic wire wrapping tools. The automatic features of such tools make them particularly useful in wiring machines such as the one disclosed in the application of T. L. Dimond, Serial No. 370,148, filed July 24, 1953. On the other hand, the semiautomatic or manual control features permit the use of these devices as hand tools.

As disclosed in the patent of Hickman, Mallina and Reck, No. 2,585,010, issued February 12, 1952, a wrapped wire electrical connection may be made with a prepared wire by means of a hand operated tool. Other tools, such as the one disclosed in the patent application Serial No. 234,643 of Frank Reck, filed June 30, 1951, will, after the insertion of a suitable insulated wire therein, cut the wire to proper length, strip the insulation from the portion to be wrapped and wrap this portion around a suitable terminal. Such a tool requires both manual and motor operation and is hand controlled. Wiring tools of the type noted require that a wire end be inserted into the wrapping head by external means each time a connection is made. For example, a wire to be connected between two terminals A and B is inserted into the tool and the connection made at A, then the other end of the wire is inserted in the tool, the tool is moved to B and the second connection is made.

One object of this invention is to facilitate the interconnection of electrical terminals by means of wrapped wire connections.

A feature of this invention resides in a wiring tool that is constructed and arranged to connect a wire between two selected terminals upon successive application of the tool to said terminals.

A more specific feature lies in a wire wrapping tool having sequentially operating elements that will take wire from a supply, connect the wire to one terminal to which the tool is applied in response to an initiating operation, and will then, upon application of the tool to the other terminal, connect the other end of the wire to said other terminal in response to a second initiating operation.

A feature subsidiary to the foregoing involves means that will initiate a connecting operation in response to either an electrical or a manual impulse or command.

Other and further objects and features of this invention will appear more fully and clearly from the following description of an illustrative embodiment thereof taken in connection with the appended drawings in which:

Fig. 1 is a view in side elevation of a tool illustrating the invention with parts broken away to show internal details;

Fig. 2 is a wiring diagram of a control circuit for the tool;

Fig. 3 is a sectional view taken on the line 3—3 of Fig. 1;

Fig. 4 is a fractional end view taken on the line 4—4 of Fig. 1;

Fig. 5 is a partial section on the line 5—5 of Fig. 6 with parts broken away;

Fig. 6 is a sectional view taken on the line 6—6 of Fig. 3;

Fig. 7 is a view taken on the line 7—7 of Fig. 6 with parts broken away to show underlying details;

Fig. 8 is a view partly in section of a portion of the wire handling apparatus shown in Fig. 6 with its operating means;

Fig. 9 is a view in elevation of the clutch means of Fig. 6 with its controlling means;

Fig. 10 is a fractional view of the feed tube of Fig. 6 with its operating means;

Fig. 11 is a view in elevation of switch and contactor operating means that are partially shown in Fig. 6;

Figs. 12 to 21 inclusive are sectional views of the wire handling means to schematically show different phases of operation;

Fig. 22 is a fractional view of the wire cutting and stripping means shown in Fig. 3; and Fig. 23 is a chart showing the sequence of operation of the various parts of the wiring tool.

Before going into a detailed description of the mechanisms comprising this wiring tool, a somewhat general discussion of it may be in order. As has been noted, the known wire wrapping tools have not been capable of accomplishing the very desirable result of connecting both ends of a wire between terminals without reloading for the second connection. The tool of this invention is equipped with wire handling elements which cooperate to produce this desirable result by means of a plurality of motor driven cams which control various wire handling elements of the tool to sequentially perform the necessary functions. Since both an initial and a terminal connection is required for each interconnection, the control means upon being actuated causes the tool to automatically make the first connection and to stop when this phase of the operation is completed. After transportation of the tool to the second terminal by hand or by mechanical means, another actuation of the control means causes the tool to automatically make the second connection and to stop at the end of this phase of the operating cycle. The complete cycle of the tool is completed when the second connection is finished.

An embodiment chosen to illustrate this invention comprises a housing 10 having a motor 11 mounted on the back wall or plate 12 and wire handling and wrapping means generally designated as 13 mounted on the front wall 14 with control and operating means mounted in the housing between these walls.

As may be seen in Figs. 1, 3 and 6, the housing 10 has a central rib 15 including a depending portion 16 for supporting elements of the wire handling means and of the operating means.

The sleeve 20 is slidably fitted in the depending portion 16 of the rib 15 and in an outboard bracket 21 mounted on the front wall 14 of the housing 10. The sleeve 20 is operated by a lever 22 pivoted on an arbor 23, the lever being in turn operated by spring and cam means to be described.

The sleeve 20 is tapered at its outer end and provided with a through bore 24 for a spindle to be described. A groove 25 extends along the top of the sleeve 20 parallel to the bore 24 and flares downward to merge with the bore adjacent the forward or outer end of the sleeve.

An insulation stripper 30 slides in the groove 25 of the sleeve 20 and is operated by a stripper rod 31 also in said groove 25. The stripper 30 is reciprocated in the groove 25 by the rod 31 and a lever 32 pivoted on the arbor 23. The lever 32 is operated by spring and cam means to be described.

A spindle 40 is journaled for rotation in the bore 24 and a bearing block 41. The spindle is driven through a cam controlled clutch to be described. The outer end of the spindle has an enlarged head 42 and is provided with a substantially axial bell mouthed terminal receiving orifice 43 and a wire receiving notch 44 (see Figs. 1, 6 and 7). Back of the head 42 is an inclined flattened area 45 having its longitudinal center line in line with the wire receiving notch 44. As may be seen in Figs. 12 to 21 inclusive the forward end of the notch 44 has a downward curvature or radius 44a over which the wire is drawn during wrapping.

A wire feeding or feed tube 50 having a main bore 50a, is slidably contained in a sloping guideway 51 in the rib 15. The feed tube 50 is reciprocable between inner and outer positions by a lever 52 pivoted to the base of the housing at 53 (see Figs. 5 and 10). The lever 52 is operated by cam and spring means to be described. The feed tube is provided with a tip 54 through which the connecting wire is fed to the other wire handling means. The outer end of the opening in the tip 54 is concentric with the main bore 50a to avoid twisting of the tube 50 by wire pull when the tool is moved from terminal to terminal.

Mounted on the top of the outboard bracket 21 is a wire cutter and clamp generally designated as 60 (see Figs. 3, 6 and 22). The cutter-clamp 60 comprises a fixed member 61 secured to the top of the bracket 21 alongside of the groove 25 in the sleeve 20. A movable member 62 is pivoted at 63 on the top of the bracket 21 and on the opposite side of the groove 25 to the member 61. The member 62 is operated by an eccentric pin 64 on the lever 65 pivoted to the bracket 21. The interaction of the fixed member 61 and the movable member 62 operates to cut or shear the wire and to clamp one portion thereof. The lever 65 is operated by a connecting rod 66 connected to a lever 67 pivoted on the arbor 23. The lever 67 is operated by cam and spring means to be described. The movable member 62 is guided and held down by the screw 72 in the slot 73.

As is shown in Fig. 7 a cover 77, which may be of thin sheet metal, extends across the top of the bracket 21. The cover 77 is secured under the stationary cutter 61 and is held down by the movable cutter member 62. The purpose of this cover 77 is to confine the stripper 30 to its groove 25 and to support the wire in the cutter-clamp.

Attached to the front wall 14 of the housing 10 are a spring finger 70 and a spring hold-down 75. The finger 70 is provided at its outer end with a wire guiding notch 71.

The cams for operating the sleeve 20, the stripper 30, the clutch 90 for the spindle 40, the feed tube 50, and the cutter-clamp 60 are mounted to rotate with the cam shaft 80, which is journaled in the sides 17 and 18 of the housing 10. The cam shaft 80 is driven through a worm wheel 81 secured thereto. A worm 82 on a shaft 83 journaled respectively in the back wall 12 and the bearing block 41, which is secured to the wall 18 drives the worm wheel 81. The shaft 83 is driven by the gear 84 from a gear 101 in the clutch drive, which in turn is driven by the motor pinion 100.

The spindle 40 is driven through a clutch generally designated as 90, which comprises the driving member 91, the driven member 92, and the yoke 93 including the springs 94. The clutch is controlled by the shifting lever 95 pivoted on the member 96 extending between the walls 17 and 18 of the housing 10. The lever 95 is biased by the spring 96a causing the follower 97 to ride on the cam 98. The cam 98 is generally circular with two depressions 99a and 99b, which allow the springs 94 to shift the driven member 92 into engagement with the driving member 91 at appropriate times in the operating cycle, to rotate the spindle 40 and to wrap an initial or a final connection. The driving clutch member 91 is driven from the motor 11 by the motor pinion 100 and the gear 101.

In order to bring the notch 44 of the wiring head 42 to a proper loading position after each operation of the spindle 40, an indexing means is provided. The indexing means comprise a cam 104 mounted on the spindle 40 between the bearing block 41 and the yoke 93, and a spring pressed detent pawl 105 mounted on the bearing block 41. The cam 104 is heart shaped so that after the clutch is released, the pressure of the pawl 105 will aid inertia forces sufficiently to bring the notch in the cam 104 around to the detent position.

The movable member 62 of the cutter-clamp 60 is, as has been indicated, operated by the lever 67 through the connecting rod 66. The follower 68 on the lever 67 rides on the cam 69 and is biased by the spring 67a. The cutter-clamp 60 is operable when the follower is riding on the lobe or high portion 69a of the cam 69 during the final connection part of the cycle. The cutting operation occurs at the beginning of the cam lobe and the clamping of the wire is continuous during the dwell on this lobe. It is noted that this is a single-lobed cam, the cutting and clamping operation being required only for the second phase of the operation cycle.

The lever 32, which operates the stripper 30 through the stripper rod 31, is pivoted on the arbor 23. The follower 33 on the lever 32 bears on the cam 34 due to the bias of the spring 35. The lobes 34a and 34b of the cam 34 are located to cause the stripping of wire at the appropriate times in both the initial and terminal wrap portions of the operating cycle. This cam is shaped so that the stripper is pulled back soon after the beginning of each wrapping phase, has a short dwell, and then restores the stripper quickly to the forward position.

The sleeve 20 is reciprocated by the lever 22 pivoted on the arbor 23. The follower 26 (Fig. 8) on the lever 22 rides on the cam 27 due to the biasing effect of the spring 28. The cam 27 is a two-lobed cam since the sleeve is reciprocated for each phase of the operation cycle. Each lobe has a rather steep rise to project the sleeve forward quickly to close the jaws of the stripper 30. Thus the insulation is cut just before the stripper starts back in the stripping operation (see Fig. 23).

The feed tube 50 is operated by the lever 52 (see Figs. 6 and 10) pivoted on the base at 53. The follower 54 on the lever 52 is biased against the cam 55 by the spring 56. The single-lobed cam 55 has a rather long dwell which keeps the feed tube 50 forward during the preparation for the initial wrapping operation and for a short time after this operation. After the tool has been positioned on the second terminal, the tube 50 is retracted laying the wire in the notch 44 of the wrapping head and the jaws of the stripper 30; and in the cutter-clamp 60. The spring finger 70 moves down due to its release by the feed tube and presses the wire into the notch 44 and into the stripper jaws. The spring hold-down 75, also due to its release by the tube 50, presses the wire into the cutter-clamp 60.

The feed tube remains retracted until after the second or terminal wrap has been completed. When the terminal wrap is completed, the tube 50 moves quickly forward to lay the wire, the end of which is clamped in the cutter-clamp 60, in the jaws of the stripper 30 and the notch 44 of the wiring head 42. The distance between the tip of the feed tube, when in retracted position, and the cutter-clamp is such that sufficient wire for the necessary connection is outside of the feed tube at this time. The cutter-clamp 60 releases the wire end during the forward movement of the feed tube.

A switch operating cam 110 is mounted on the cam shaft 80 (Fig. 11) and operates a single-pole double-throw auxiliary switch 111 to initial connection position during the first phase of the cycle and to terminal connection position during the second phase of the cycle. This switch 111 cooperates with an initiating or control switch 130 to control the two phases of the wire connecting cycle, as will be explained.

For use in wiring machines such as the one disclosed in the noted application of T. L. Dimond, a signaling cam 120 is provided on the cam shaft 80. This cam 120 has two projections 121a and 121b for momentarily closing the contactor 122 to give a signal impulse indicating the completion of each phase of the operating cycle of the wire wrapping tool.

A single-pole double-throw control switch 130 is operable by the push button 131a or 131b, or by the solenoid 132a, or 132b to initiate each phase of the operating cycle. The push-button operation is used for manual control of the cam, and the solenoids when the tool is used with a record controlled wiring machine such as the one disclosed in the noted Dimond application.

The switches 111 and 130 and the motor 11 are interconnected with a power source 140 in accordance with the circuit of Fig. 2. This is the well known circuit often called "three-way" by means of which the working circuit may be opened or closed at either switch. In the particular use here, the circuit is open as shown in Fig. 2 prior to starting the first phase of the operation. Transferring of the connections at the switch 130 by the appropriate push button 131 or solenoid 132, say 131a or 132a, connects the motor 11 to the source 140 and the first phase starts. When this phase is completed, the cam 110 transfers the connections of the auxiliary switch 111 to open the circuit and to stop the motor. When the tool is ready for the second phase of the operation, the connection at 130 is transferred by the button 131b or the solenoid 131b, the motor 11 operates and after completion of the cycle the cam 110 transfers the connection at the switch 111 to stop the motor. The switches are then back to the position shown in Fig. 2 ready for another cycle.

If this wiring tool is to be used manually only, the cam 120, the contactor 122, the solenoids 132a and 132b and the necessary connecting wires may be omitted if desired. The power connections, and also the control and signal connections, if used, may be brought into the motor by way of the cable 150.

The wire 160 may be supplied to the feed tube 50 from a suitable reel, spool or other storage means (not shown). For use in a machine wiring system, the wire storage means may well be mounted on the tool or some part that moves with the tool.

In order to illustrate various steps in the complete operating cycle for interconnecting two terminals A and B, a series of views of the wire handling means is schematically shown in Figs. 12 to 21 inclusive. In Figs. 12 through 15 the tool is shown as applied to the first terminal for the initial end wrap. In Fig. 12 the wire 160 is shown in the spindle notch 44 and in the now open jaws of the stripper 30 which is in its forward position, the sleeve 20 being retracted. The feed tube 50 is in the forward position with the spring finger 70 and the spring hold-down 75 resting upon it. The cutter-clamp 60 is open at this time. The wire 160 has been previously cut to length as will appear in the ensuing description.

Fig. 13 shows the sleeve 20 moved to the forward position which closes the jaws of the stripper 30 to cut the insulation on the wire 160. The other parts remain as in Fig. 12.

The stripper 30 has moved back in the view of Fig. 14, having stripped the portion 161 of the wire 160. The stripped insulation is shown at 162 being discarded. The other parts remain in the positions of Fig. 13.

In Fig. 15 the spindle 40 has been rotated to make the wrapped connection with the initial end of the wire on the terminal A. The spindle 40 has been moved back into the sleeve 20 by the connection as it was wrapped, slightly compressing the springs 94 of the clutch assembly (see Fig. 6). The remaining parts continue in their positions of Fig. 14.

In Fig. 16 the tool has been applied to the terminal B, the wire 160 being paid out through the feed tube 50 during the movement from A to B. The sleeve 20 has been retracted and the stripper 30 moved forward again. The other elements are still in the positions of Fig. 15.

In Fig. 17 the feed tube 50 has been withdrawn laying the wire 160 along the wiring head notch 44, the stripper 30 and the cutter-clamp 60. The spring finger 70 pushes the wire into the notch 44 and the stripper 30. The spring hold-down 75 positions the wire between the cutter-clamp members 61 and 62 (see Figs. 3 and 22). The stripper 30 and the sleeve 20 remain in their positions of Fig. 16 and the cutter-clamp 60 remains open.

In Fig. 18 the cutter-clamp 60 has closed to cut the wire 160 and is clamping the supply end 164 thereof. The sleeve 20 has moved forward closing the jaws of the stripper 30 to cut the insulation of the wire 160. The members 50, 70 and 75 remain in their positions of Fig. 17.

In Fig. 19 the stripper 30 has moved back stripping the insulation 162 from the portion 161 of the wire 160. The supply end 164 of the wire remains in the cutter-clamp 60 and the other parts in their positions of Fig. 18.

In Fig. 20 the second or terminating connection has been wrapped and the spindle 40 has moved back against the springs 94 as it did with the first connection shown in Fig. 15.

In Fig. 21 the sleeve 20 has moved back, the stripper 30 has moved forward, and the feed tube 50 is in an intermediate position of forward movement. As the feed tube 50 moves forward, the wire 160, held during the first part of this movement by its end 164 in the cutter-clamp 60, is laid between the now open jaws of the stripper 30 and in the notch 44 of the wrapping head 42. The cutter-clamp 60 opens before the tube 50 reaches its extreme forward position. When the feed tube has reached its forward position, the parts will be as shown in Fig. 12 ready for a new cycle.

In order to prepare the wiring tool for operation, it must be loaded with wire and put into the condition shown in Fig. 12, i. e. ready for an initial end wrap. One way of doing this is to operate the tool without wire until the parts are in the position shown in Fig. 17. The wire 160 may then be inserted in the top end of the feed tube and brought out under the spring hold-down 75 and laid in the cutter-clamp 60 with a small portion protruding. If the tool is now operated through the positions of Figs. 18 through 20 inclusive, it will go through the motions of a second or final end connection with no wire being wrapped, meanwhile holding the cut end 164 of the wire 160 in the cutter-clamp 60. When the position of Fig. 21 is reached, the wire will be loaded into the stripper 30 and the wiring head notch 44. The condition of Fig. 12 will be reached and the tool may then be stopped ready for an initial wrap.

Loading could also be done by starting with the parts as in Fig. 16 with the feed tube forward. After the wire 160 is inserted in the feed tube the end may be held, and the tool operated as previously described. After the cutter-clamp 60 has operated, the cut off end portion may be pulled out and discarded.

In order to show the correlation amongst the various elements of the wiring tool, reference is made to the operation sequence chart shown in Fig. 23. The chart is for one revolution of the cam shaft 80 to which the control cams are secured. The break near the middle of the chart represents the period between the initial and terminating connection phases of the operation cycle during which the tool is moved from the terminal A to the terminal B. The cycle repeats for each complete revolution of the cam shaft.

At the beginning of the cycle, which has been designated as zero degrees, the tool elements are in the condition shown in Fig. 12 and the tool is on the terminal A for the initial connection. The auxiliary switch 111 being in position 1 (Fig. 2), closure of the control switch 130 to the position for an initial connection starts the motor 11. During the first 35 degrees, the sleeve 20 moves forward to the position of Fig. 13 cutting the insulation on the wire. At the 35 degree position the stripper 30 starts back and strips the insulation. When the 115 degree position is reached the stripper is clear back and the clutch is engaged to rotate the spindle 40 to wrap the initial connection. The clutch is released at 129 degrees when the wrapping is complete. The sleeve and the stripper cams move the sleeve back and the stripper forward starting also at 129 degrees. The auxiliary switch 111 is shifted to position 2 at 130 degrees. The motor is thus de-energized and stops within 3 degrees. This lag does not affect the parts moved by the cams since all of the followers are presently riding on a constant radius portion of their respective cams.

The tool is now removed from the terminal A and transferred to terminal B for the terminating or final end connection. The control switch 130 is shifted to the position for a terminating connection and the motor 11 starts because of the previous shifting of the auxiliary switch to the position 2. At 133 degrees the feed tube 50 is drawn back placing the wire in the wrapping head notch 44 and the stripper 30. The sleeve starts forward at 133 degrees and arrives at its forward position at 168 degrees causing the stripper 30 to cut the insulation or wire.

At 168 degrees the cutter-clamp 60 is closed, cutting the wire and clamping the end protruding from the feed tube 50. The wire cutting and clamping is complete at 183 degrees and the stripper starts back. When the stripper reaches its rearward position at 263 degrees of cam rotation, the wrapping means is again actuated by engagement of the clutch to make the second or terminating connection. The clutch is released at 277 degrees when the wrapping is completed. The sleeve and the stripper cams move the sleeve back and the stripper forward starting at 277 degrees.

The feed tube starts forward at 280 degrees laying the wire in the stripper 30 and the notch 44. At 360 degrees the feed tube is in its extreme forward position.

During the forward movement of the feed tube 50 and before any appreciable tension has been exerted on the wire in the cutter-clamp 60, this clamp is released. This may be at say 318 degrees as indicated in the chart.

At 360 degrees the auxiliary switch 111 operates to the position 1 de-energizing the motor 11 and setting up the tool for an initial end wrap when the control switch 130 is again shifted to the initial connection position. The tool is moved to another terminal for another initial end connection.

The operating sequence for the signaling contactor 122 has not been shown on the chart of Fig. 23. The momentary operation of this contactor to give an "operation completed" signal, occurs each time the auxiliary switch 111 shifts to an alternate position to stop the motor 11.

What is claimed is:

1. A wire wrapping tool comprising a housing, a motor mounted on the housing, wire handling means mounted on the housing, operating means and control means in the housing; said wire handling means including a grooved sleeve reciprocable in the housing, a wire wrapping spindle within the sleeve, a reciprocable stripper slidable in the groove of the sleeve, wire cutting and clamping means secured to the housing adjacent to the sleeve, a wire feeding tube reciprocable in the housing; a clutch for connecting the spindle to the motor, cams connected to and operable by the motor, shiftable means controlled by said cams for operating the clutch, the stripper, the sleeve, the cutter and clamp, and the feed tube; control means for starting the motor, and cam operated auxiliary control means for stopping the motor.

2. A wire wrapping tool for interconnecting electrical terminals comprising a wire wrapping means, means for feeding wire to said wire wrapping means, means for cutting the wire, and means for stripping insulation from a portion thereof; means for operating all of the indicated means sequentially in a cycle including two phases, during one of which one end of a wire is connected to a terminal and during the other of which the other end of the wire is connected to another terminal, and control means including means for starting the operating means at the beginning of each phase and for stopping the operating means at the end of each phase.

3. A wire wrapping tool comprising a rotatable spindle including a wire wrapping head, an insulation cutting and stripping means, means including a reciprocable feed tube for feeding wire to the wrapping head and to the stripping means, a reciprocable sleeve for operating the cutting and stripping means to cut insulation, a wire cutting and clamping means, cams and cooperating levers for coordinately operating the spindle, the cutting and stripping means, and the cutting and clamping means, motor means connected to the cams and connectable to the spindle for operation thereof, and control means for the motor means.

4. An automatic wire wrapping tool for interconnecting electrical terminals comprising a wire wrapping means, wire handling means including means for cutting wire, means for stripping the wire, means for feeding the wire to the wire wrapping means, to the cutting means and to the stripping means; means for coordinating the operation of the indicated means including sequentially operating means and control means; means for driving all of said means; and initiating means for starting the driving means.

5. An automatic wiring tool for interconnecting terminals comprising a rotatable wire wrapping spindle, means to supply wire to said spindle including a feed tube, a finger and a hold-down, means for conditioning the wire for wrapping including an insulation stripper, a movable sleeve for causing the stripper to cut insulation, and a wire cutter-clamp, a motor, clutch means for connecting the motor to rotate the spindle, means driven by the motor including cams, cam followers, and levers for actuating the feed tube, the stripper, the sleeve, the cutter-clamp, and the clutch; switch means for energizing the motor, and cam-operated switch means for de-energizing the motor after the wrapping of each connection.

6. An automatic wiring tool for interconnecting terminals comprising a wire wrapping head on the end of a rotatable spindle, means to supply wire to said head including a feed tube, means for conditioning the wire for wrapping including an insulation stripper, a sleeve embracing the stripper, and a wire cutter-clamp, a motor, clutch means for connecting the motor to rotate the spindle, means driven by the motor, including cams, for actuating the feed tube, the stripper, the sleeve, the cutter-clamp, and the clutch to supply and condition the wire and to make connections to terminals, switch means for initiating the operation of the tool, and cam operated switch means for stopping the tool after the making of each connection.

7. An automatic wiring tool for interconnecting terminals comprising a rotatable wire wrapping head, means to supply wire to said head, means for conditioning the wire for wrapping, a motor, clutch means for connecting the motor to rotate the wrapping head, means driven by the motor for actuating the wire supplying and the wire conditioning means, and the clutch, means for initiating the operation of the tool, and auxiliary means for stopping the tool after the wrapping of each connection.

8. An automatic wiring tool for interconnecting terminals comprising a wire wrapping head on the end of a rotatable spindle, means to supply wire to said head including a feed tube, a spring finger, and a spring hold-down; means for conditioning wire for wrapping including an insulation stripper, a reciprocable sleeve for causing the stripper to cut insulation, and a wire cutter-clamp, a motor, clutch means for connecting the motor to rotate the spindle, means driven by the motor for actuating the feed tube, the stripper, the sleeve, the cutter-clamp, and the clutch means in proper sequence to supply and condition the wire and to make successive connections to different terminals with the opposite ends of the same wire; switch means for initiating the operation of the tool, and auxiliary switch means connected to the motor for stopping the tool after the making of each connection.

9. An automatic wiring tool for interconnecting terminals comprising a wire wrapping head, means to supply wire to said head including a feed tube, a spring finger, and a spring hold-down; means for conditioning wire for wrapping including an insulation stripper, a reciprocable sleeve for causing the stripper to cut insulation, and a wire cutter-clamp, a motor, connecting means between the motor and the wrapping head, means driven by the motor for actuating the feed tube, the stripper, the sleeve, the cutter-clamp, and the connecting means in proper sequence to supply and condition the wire and to make successive connections to different terminals with the opposite ends of the same wire; means for initiating the operation of the tool, and auxiliary means for stopping the tool after the making of each connection.

10. An automatic wiring tool for interconnecting terminals comprising a wire wrapping head on the end of a rotatable spindle, means to supply wire to said head including a feed tube, a spring finger and a spring hold-down, means for conditioning wire for wrapping including an insulation stripper, a reciprocable sleeve for causing the stripper to cut insulation, and a wire cutter-clamp, a motor, clutch means for connecting the motor to rotate the spindle, means including cams, cam followers, and levers driven by the motor for actuating the feed tube, the stripper, the sleeve, the cutter-clamp, and the clutch in proper sequence to supply and condition the wire and to make successive connections to different terminals with the opposite ends of the same wire; solenoid operated switch means for initiating the operation of the tool, and cam operated switch means for stopping the tool after the making of each connection.

11. An automatic wiring tool as in claim 10 including a cam operated contactor for closing a signaling circuit immediately after the making of each connection.

12. An automatic wiring tool as in claim 10 in which the switch means for initiating the operation of the tool is also manually operable.

13. An automatic wiring tool for interconnecting terminals that comprises a housing, a motor mounted on the back wall of the housing, a bracket mounted on the front wall of the housing, a rib depending from the top wall of the housing, a grooved sleeve slidably fitted through said bracket and the lower portion of said rib and projecting from said bracket, a spindle rotatable within said sleeve, said spindle having a notched enlargement comprising a wiring head at its outer end and a flattened portion back of said enlargement in line with the notch, detent means for normally retaining said spindle with the notch in line with the groove of the sleeve, an insulation stripper slidable in the groove of the sleeve and on the flattened portion of the spindle, said stripper having mating insulation cutting jaws biased to open position but closable by said sleeve; a cutter-clamp mounted on said bracket, said cutter-clamp including a fixed cutting and clamping member on one side of the sleeve groove and a pivoted cutting and clamping member on the opposite side of said groove; a feed tube reciprocably mounted in said rib and having a wire feeding tip for forward and backward travel over the wiring head, the stripper, and the cutter-clamp; a spring finger and a spring hold-down mounted on the front wall of the housing above said bracket, said finger having a tip projecting beyond the end of and biased toward said wrapping head and said hold-down having a tip adjacent to and biased toward the cutter-clamp, said finger and hold-down being movable against their respective biases by the feed tube; a clutch for connecting the spindle for rotation by the motor; a cam shaft journaled between the side walls of said housing and geared for rotation by said motor, a plurality of cams on said shaft, a plurality of levers pivoted to the housing, each lever having a follower and being biased to cause the follower to ride on one of said cams, said levers being connected respectively to operate the clutch, the sleeve, the stripper, the cutter-clamp, and the feed tube; means for energizing said motor, and means operable from the cam shaft to de-energize the motor.

14. An automatic wiring tool for interconnecting terminals that comprises a housing, a motor mounted on the back wall of the housing, a bracket mounted on the front wall of the housing, a rib depending from the top wall of the housing, a grooved sleeve slidably fitted through said bracket and the lower portion of said rib and projecting from said bracket, a spindle rotatable within said sleeve, said spindle having a notched wiring head at its outer end, detent means for retaining said spindle with the notch in line with the groove of the sleeve, an insulation stripper slidable in the groove of the sleeve, said stripper having insulation cutting jaws closable by said sleeve; a cutter-clamp mounted on said bracket, a feed tube reciprocably mounted in said rib and having a wire feeding tip for forward and backward travel over the wiring head, the stripper, and the cutter-clamp; a spring finger and a spring hold-down mounted on the front wall of the housing above said bracket, said finger having a tip projecting beyond the end of and biased toward said wrapping head and said hold-down having a tip adjacent to and biased toward the cutter-clamp, said finger and hold-down being movable against their respective biases by the feed tube; a clutch for connecting the spindle for rotation by the motor; a cam shaft journaled between the side walls of said housing and geared for rotation by said motor, a plurality of cams on said shaft, a plurality of spring biased levers pivoted to the housing, each lever having a follower riding on one of said cams, said levers being connected respectively to operate the clutch, the sleeve, the stripper, the cutter-clamp, and the feed tube; means for energizing said motor, and means operable from the cam shaft to de-energize the motor.

15. An automatic wiring tool for interconnecting terminals that comprises a housing, a motor mounted on the housing, a bracket mounted on the housing, a grooved sleeve slidably fitted through said bracket and the housing and projecting from said bracket, a spindle rotatable within said sleeve, said spindle having a notched enlargement comprising a wiring head at its outer end and a flattened portion back of said enlargement in line with the notch, detent means for normally retaining said spindle with said notch in line with the groove of the sleeve, an insulation stripper slidable in the groove of the sleeve and on the flattened portion of the spindle, said stripper having cutting jaws biased to open position but closable by said sleeve; a cutter-clamp mounted on said bracket, a feed tube reciprocably mounted on said housing for forward and backward travel over the wiring head, the stripper, and the cutter-clamp; a spring finger and a spring hold-down mounted on the housing, said finger projecting beyond the end of and biased toward said wrapping head and said hold-down being adjacent to and biased toward the cutter-clamp; a clutch for connecting the spindle for rotation by the motor; a cam shaft mounted on said housing and connected for rotation by said motor, a plurality of cams on said shaft, a plurality of levers pivoted to the housing, each lever associated with one of said cams, said levers being connected respectively to operate the clutch, the sleeve, the stripper, the cutter-clamp, and the feed tube; means for energizing said motor, and means operable from the cam shaft to de-energize the motor.

16. An automatic wiring tool for interconnecting terminals that comprises a housing, a motor on the housing, a bracket on the housing, a rib depending from the top of the housing, a grooved sleeve slidably fitted through said bracket and the lower portion of said rib and projecting from said bracket, a spindle rotatable within said sleeve, said spindle having an enlargement including a notch and comprising a wiring head at its outer end and a flattened portion back of said enlargement in line with said notch, detent means for normally retaining said spindle with said notch and flattened portion in line with the groove of the sleeve, an insulation stripper slidable in the groove of the sleeve and on the flattened portion of the spindle, a cutter-clamp mounted on said bracket, a feed tube reciprocably mounted in said rib for forward and backward travel over the wiring head, the stripper, and the cutter-clamp; a spring finger and a spring hold-down mounted on the housing above said bracket, said finger having a tip projecting beyond the end of and biased toward said wrapping head and said hold-down having a tip adjacent to and biased toward the cutter-clamp, a clutch for connecting the spindle to the motor; a cam shaft in said housing and connected to said motor, a plurality of cams on said shaft, a plurality of levers pivoted to the housing, each lever having a follower, spring means for biasing each follower toward one of said cams, said lever being connected respectively to operate the clutch, the sleeve, the stripper, the cutter-clamp, and the feed tube; means for energizing said motor, and means operable from the cam shaft to de-energize the motor.

17. An automatic wiring tool for interconnecting terminals that comprises a housing, a motor on the housing, a bracket on the housing, a grooved sleeve slidably fitted through said bracket and the housing, a spindle rotatable within said sleeve, said spindle having a wiring head at its outer end, an insulation stripper slidable in the groove of the sleeve, said stripper having mating insulation cutting jaws biased to open position but closable by said sleeve; a cutter-clamp mounted on said bracket, a feed tube reciprocably mounted in said housing for travel over the wiring head, the stripper, and the cutter-clamp; a spring finger and a spring hold-down mounted on the housing, said finger being biased toward said wrapping head and said hold-down being biased toward the cutter-clamp, said finger and hold-down being movable against their respective biases by the feed tube; a clutch for connecting the spindle for rotation by the motor; a cam shaft in said housing, means connecting said shaft for rotation by said motor, a plurality of cams on said shaft, a plurality of levers pivoted to the housing, each lever being operable by one of said cams, said levers being connected respectively to operate the clutch, the sleeve, the stripper, the cutter-clamp, and the feed tube; means for energizing said motor, and means operable from the cam shaft to de-energize the motor.

18. An automatic wiring tool for interconnecting terminals that comprises a housing, a motor on the housing, a grooved sleeve slidably fitted through said housing, a spindle rotatable within said sleeve, said spindle having a wiring head at its outer end, an insulation stripper slidable in the groove of the sleeve, a cutter-clamp on said housing, a feed tube reciprocably mounted in said housing, a spring finger and a spring hold-down mounted on the housing, a clutch for connecting the spindle for rotation by the motor; a cam shaft in said housing and connected for rotation by said motor, a plurality of cams on said shaft, a plurality of levers pivoted to the housing, each lever operable by one of said cams, said levers being connected respectively to operate the clutch, the sleeve, the stripper, the cutter-clamp, and the feed tube; means for energizing said motor, and means operable from the cam shaft to de-energize the motor.

19. A wiring tool for interconnecting terminals that comprises means for connecting the end of a wire to a terminal, means for preparing the wire for making a connection, means for feeding the wire to the preparing and connecting means, means for controlling the before noted means including cyclically operable means for directing the feeding means, the preparing means, and the connecting means to prepare and to connect one end of a wire to a terminal and then to prepare and to connect the other end of said wire to another terminal.

20. A wiring tool for interconnecting terminals that comprises means for connecting a wire to a terminal, means for supplying wire to the connecting means, motor means, means connected between the motor means and the wire connecting and supplying means, and under the control of initiating means, for operating said means to connect an end of a wire to a terminal and to de-energize the motor means, and then upon operation of the initiating means to connect the other end of said wire to a terminal.

No references cited.